United States Patent
Acharya et al.

(10) Patent No.: US 6,351,555 B1
(45) Date of Patent: Feb. 26, 2002

(54) EFFICIENT COMPANDING ALGORITHM SUITABLE FOR COLOR IMAGING

(75) Inventors: Tinku Acharya, Tempe; Werner Metz, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/482,551

(22) Filed: Jan. 13, 2000

Related U.S. Application Data (62) Division of application No. 08/978,786, filed on Nov. 26, 1997, now abandoned.

(51) Int. Cl.[7] ............................................. G06K 9/00
(52) U.S. Cl. ..................... 382/162; 382/166; 382/274
(58) Field of Search ............................... 382/162, 167, 382/169, 274, 166

(56) References Cited

U.S. PATENT DOCUMENTS

| | | | |
|---|---|---|---|
| 5,181,105 A | * | 1/1993 | Udagawa et al. ............. 358/80 |
| 5,708,729 A | | 1/1998 | Adams et al. |
| 5,790,705 A | | 8/1998 | Anderson et al. |

FOREIGN PATENT DOCUMENTS

EP            0516083 A2 * 12/1992

* cited by examiner

Primary Examiner—Phuoc Tran
(74) Attorney, Agent, or Firm—Blakely, Sokoloff, Taylor & Zafman LLP (57) ABSTRACT

A companding method is disclosed where a set of factors related to the color characteristics of captured images are determined. Using these characteristics, a companding scheme is developed such that each pixel is lowered in resolution, but in such a manner that the image retains important features. These factors related to color characteristics are determined in part by analyzing histograms related to the image.

15 Claims, 4 Drawing Sheets

EFFICIENT COMPANDING ALGORITHM SUITABLE FOR COLOR IMAGING

This application is a divisional of U.S. patent application Ser. No. 08/978,786 filed Nov. 26, 1997 (now abandoned.)

BACKGROUND OF THE INVENTION

1. Field of the Invention

The invention relates generally to the field of digital image processing. More specifically, the invention relates to methods and apparatus for image representation and enhancing digital image compression techniques.

2. Description of the Related Art

In digital imaging, which is the process of capturing and representing into digital form a real image, there is a tradeoff between the size and accuracy of the digital image. Typically, as the size of an image (when digitally represented) is increased, the resultant quality of the digital image (when compared to the original) is also increased. One particular step in the imaging process where this is particularly true when a captured image undergoes "companding." Companding is the procedure by which a higher resolution pixel is reduced to a lower resolution. The typical image sensor, the focal device which initially captures a light or color intensity of an image, generates pixels of 10 or more bits based on the analog-to-digital conversion characteristics. Thus, for example, when a digital still camera takes a picture, the image is first represented by the sensing elements as a group of color/intensity values which can have $2^{10}$ or 1024 possible values. Pixels from an image sensor that compose a captured image however, are not optimized for most image processing/compression algorithms which are designed for pixel values in multiples of 8 bits. This is due primarily to the fact that image processing has traditionally been performed on computer systems where the unit of a "byte" (8 bits) served as a basis of computer system architectures. Thus, a vast majority of image compression schemes and techniques, as well as image representation methods, are designed around the 8-bit (byte) model. To take advantage of these pre-existing techniques and to interface digital cameras with computer systems, it would thus be advantageous to reduce all pixels of 10-bit resolution (or any resolution greater than and not a multiple of 8 bits) to pixels of 8 bit resolution.

While doing so, it would also be desirable to preserve key image information such as edges, shading and color. The crude method for companding involved a mere truncation of the 2 least significant bits. This equates to dividing the pixel value by four. Such a simple linear transformation does not take into account the statistical properties of the image, i.e., how pixel values are clustered or distributed throughout the image. For instance, if an image contains a pixel value that repeatedly occurs, and then at a particular location, changes slightly, this information should not be lost. Assume for example a solid color region of an image which fades into a different color. The boundary pixels between the solid color and the faded portion should be appropriately represented. For instance, if the solid color region has values of say 514 and the boundary pixel a value of 513, the traditional companding technique would educe these pixels both to a value of 128. Thus, the edge information represented by the boundary pixel value 513 between the faded region and the solid color region is lost and the edge will disappear in the companded image.

The end result visually to the human eye of any companding is a change in the contrast of each pixel from bright to dark. If the companding process is performed as a straightforward linear mapping as discussed above the change in contrast will reduce detail information of the image, and thus, lower the image quality. However, if companding can be achieved in a manner more indicative of the characteristics of the image, then the resultant change in contrast will also preserve the essential image features or characteristics.

It would be desirable to compand in an intelligent manner to preserve more details and colors of an image by taking into account the characteristics of the image itself. Further, it would be advantageous to compand in a manner that is suited to implementation in VLSI (Very Large Scale Integration) circuits such as those found in low cost imaging devices.

SUMMARY OF THE INVENTION

What is disclosed is a method including determining a set of factors related to the color characteristics of a captured image and then companding the captured image into a companded image having a lower bit-per-pixel resolution, the companding dependent upon that set of factors.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

The following description refers to captured image pixels as "pixels". In digital still and video cameras and certain other imaging devices, raw images are first represented as rectangular row and column of pixels with each pixel having the intensity value of a particular color only. In the case of RGB (Red, Green and Blue) sub-sampling imaging devices, images are obtained and stored in a "Bayer" pattern. The Bayer pattern, when three color planes are sub-sampled using a color filter array (CFA), is characterized by including on a first row of an image, alternating pixels of Green and Red, and then on a next row alternating pixels of Blue and Green. Thus, the Bayer pattern for the first four rows of pixels (with each pixel typically an 8-bit value) is as follows (with the rows thereafter repeating the same pattern):

```
G R G R G R ...
B G B G B G ...
G R G R G R ...
B G B G B G ...
        ⋮
```

As a result, each pixel location contains a value representative of a single color component (either R, G, or B) only. A full color pixel, once constituted would have all three components.

If captured from an L-bit resolution imaging device, each pixel of the image can have an intensity value for its color plane in the Bayer pattern from 0 to $2^L-1$ for a total of $2^L$ possible values. The goal of the companding process is to reduce the L-bit resolution pixel to a lower resolution, and in most sensor-based imaging systems this entails reducing a captured 10-bit per pixel image to an 8-bit per pixel image. Thus, in most systems, a mapping of a set of 1024 possible values to 256 values is performed. Consequently, each pixel of the captured image must be replaced with a "companded" value according to the resultant mapping. Ordinarily, not all of the 1024 possible pixel values would appear in the captured image, and of those that do appear, they will be present in the image with varying "density" ("density" is defined as the number of occurrences of a value within an image or portion thereof). The density counts are compiled into a histogram table and by analyzing this histogram, certain image characteristics can be derived.

In the prior art, companding is achieved using a linear mapping. For instance, the companding may be as routine as merely dividing each pixel by a companding ratio $2^{(L-J)}$ where L is the original bit resolution of the captured images and J, the desired companded resolution. Such a division of every pixel ignores the distribution of certain values as compared to others, but can be easily implemented by shifting of bits representing each value. By this uniform treatment, many important image features are lost in the resultant companded image. The invention provides for a more intelligent companding technique. The methodology and apparatus described in the various embodiments of the invention preserves image features after companding and results in a better visual rendering when finally output.

When an image is sensed or first obtained from an imaging device such as a digital camera sensor, often, the pixels are distributed in a Color Filter Array (CFA) pattern known as the Bayer pattern. The Bayer pattern CFA sub-samples the Red (R), Green (G) and Blue (B) color planes independently such that each pixel when captured has only one of the those three color components present. Thus, in an imaging device that initially captures L-bit values for each pixel, each L-bit value will be one of a range of values from 0 to $2^L-1$, with each value associated with either Red, Green, or Blue color planes.

When L is 10, each pixel will have a 10-bit value. The collection of 10-bit values which comprise the image array is inconvenient and awkward for purposes of processing and transport since most communication mechanisms such as busses or buffers or memories ordinarily prefer that data be in 8-bit chunks. Thus, to employ traditional processing methodology and architecture based on 8-bit words, both within a computer system or other digital device using data processing components such as buffers or RAM, it would be useful to convert the 10-bit values into 8-bit values even at the expense of losing two bits of resolution per pixel.

Further, many image processing procedures, such as JPEG compression, are designed for 8-bit values and thus, the image is more usable if in 8 bits rather than 10.

One further aspect of Bayer pattern CFA images is that eventually, each pixel location has to be completed with the missing color component values to form a full RGB color at each pixel. Thus, if a particular pixel was sensed with only Red color component information, the other two color components Green and Blue, must be estimated or predicted. When so predicting, it is important that the original calorimetric ratio (R values: G values: B values) is closely preserved. When companding from L-bits per pixel to J-bits per pixel where J is less than L, the companding technique that is used should optimally help to maintain this ratio such that the procedure of color interpolation, which is usually performed when the image is ready to be output or displayed, yields better results.

The various embodiments described herein attempt to take the above considerations into account and thus provide an enhanced technique of companding.

Figure 1:
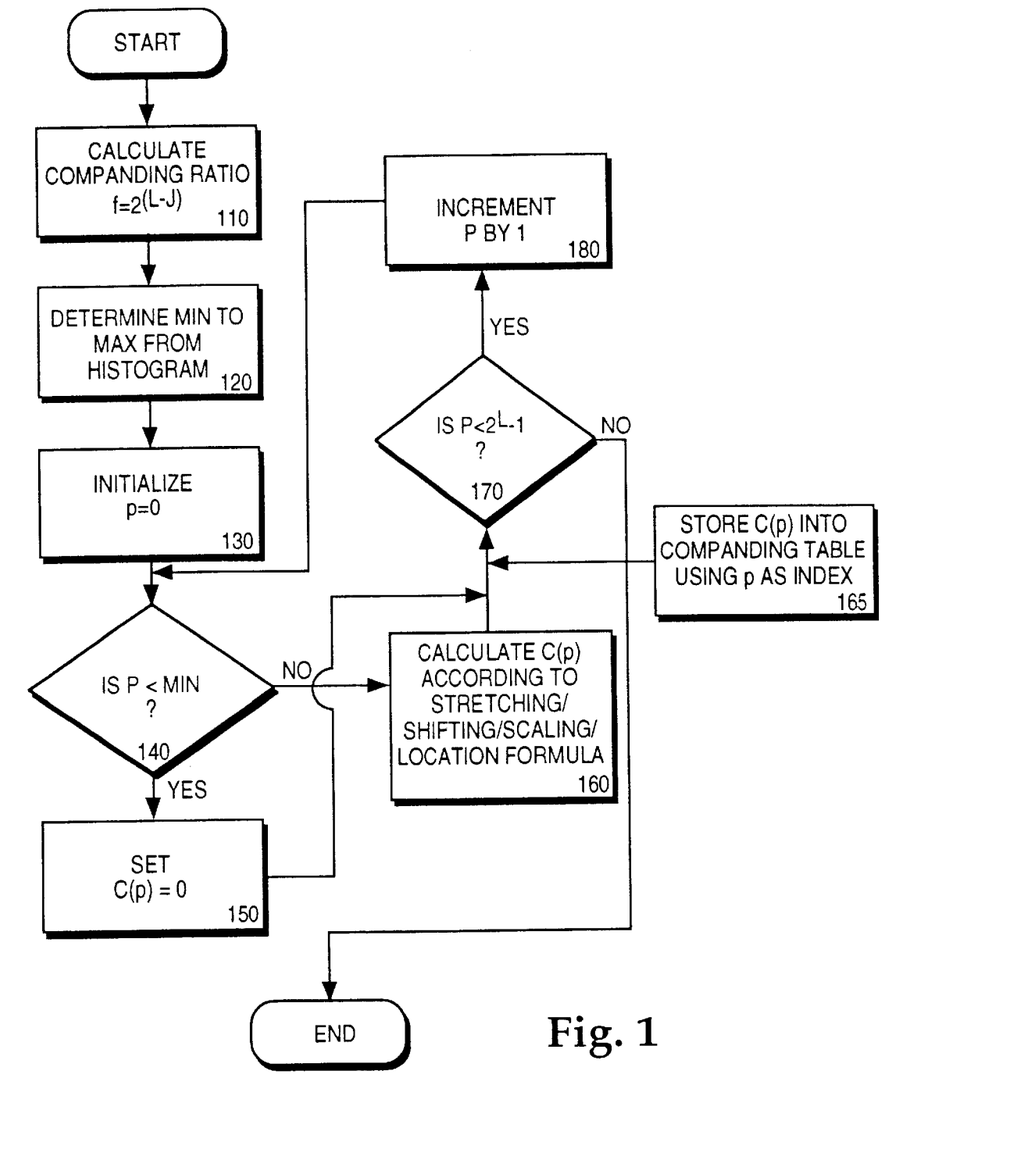
FIG. 1 illustrates a flow diagram of one embodiment of the invention.
Figure 2:
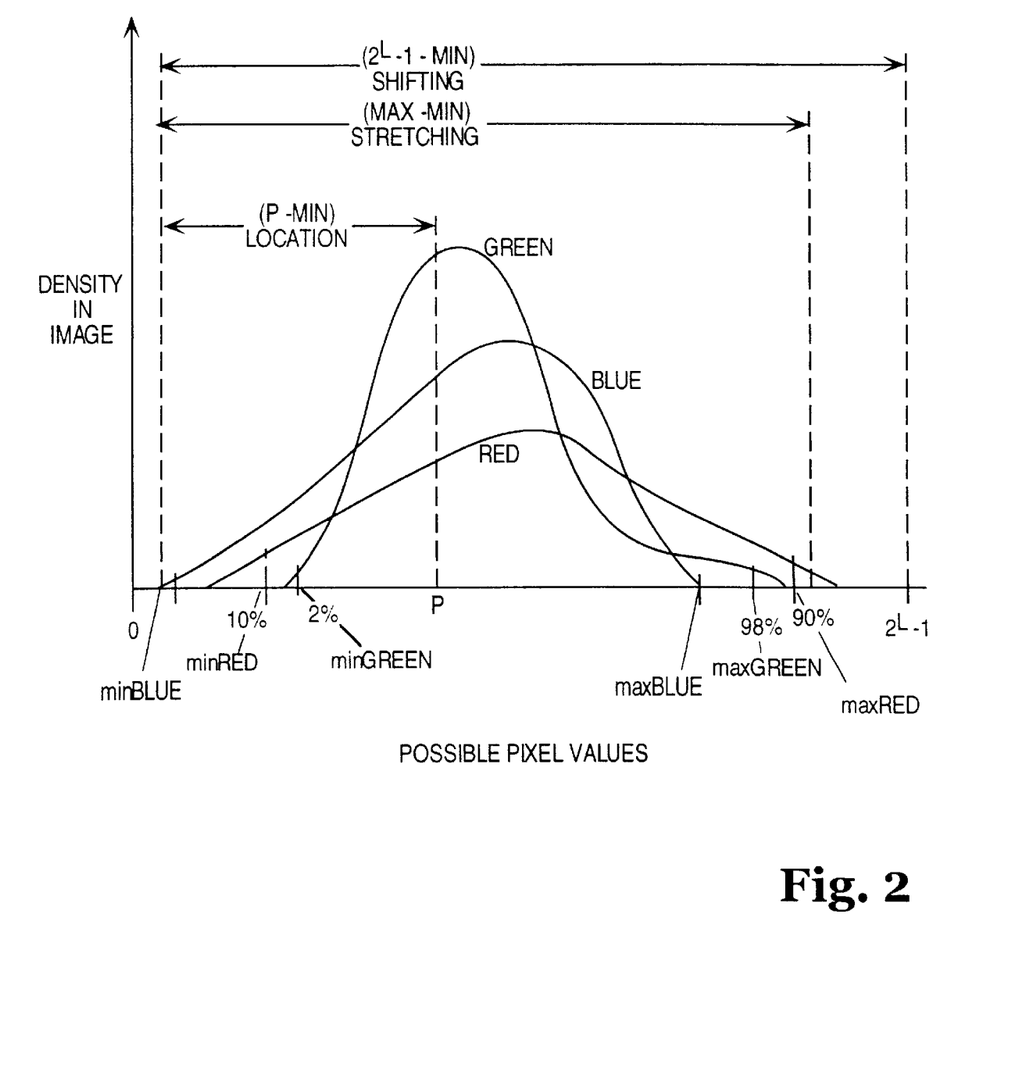
FIG. 2 is a graph of R, G and B histograms superimposed together to illustrate the factors of the companding technique according to one embodiment of the invention.

The methodology of FIG. 1 assumes that a histogram or density count of the pixel values within an image is already compiled and available for use. Since there are three color planes, R, G and B present in the image, each color plane will desirably have a separate histogram or distribution of values. Thus, three histogram tables are desirable. FIG. 2 shows exemplary curves for histograms of three color planes.

According to FIG. 1, the first step in companding, according to this embodiment of the invention, is to calculate a linear scaling factor that if used with any other modifier, would result in a simple linear mapping of L-bit to J-bit values by division (left shift of bits) (step 110). This scaling factor is present in the traditional companding technique, but is often the limit of the intelligence that these techniques employ. Such techniques simply divide the L-bit values by the scaling factor to obtain the compounded values. This scaling factor f is $2^{(L-J)}$, wherein L is the number of bits resolution for pixels in the original image and J the number of bits resolution for pixels.

The next step is to calculate the maximum and minimum of values from the histogram (step 120) (refer to FIG. 2 and associated description for further explanation). The maximum and minimum refers to the largest and smallest of the possible pixel values whose density count or distribution within the image to be companded is greater than zero or some other low count value (percentile in histogram) based upon the characteristics (noise properties) of the sensing device generating the CFA or based upon the properties of the histogram. Since only one companding table will be used, according to one embodiment of the invention, for companding values associated with all three color planes, the minimum is the minimum value for all three R, G and B color histograms. This ensures that no values (within a tolerance range) are excluded from the companding process and that the entire range of values present in the originally captured image (for each color plane) can be mapped to new values.

Since the "companding" process maps an unknown number of original pixel values (to a maximum of $2^L$) to a lesser number $2^J$ companded values, an indexing variable p is utilized that incremently approaches $2^L-1$ from an initial value of zero. The indexing variable p is initialized to a value of zero at step 130 at the start of the companding behavior determination. The next step is to check whether the current value of p is less than the minimum (min) (step 140) of the histogram values calculated (refer to FIG. 2 and associated description). If the value p is less than min, then the companded value C(p) for that pixel value p is set as zero (step 150). For original L-bit values p that are below the minimum no companding calculation is desirable since they are not present (except perhaps as noise) in the original image color histograms. If p is greater than or equal to the minimum, then the companded value C(p) to which p will be mapped is calculated according to some optimal formula that involves a stretching, scaling, location and shifting factors (step 160). For instance, in one embodiment of the invention, the companding behavior for C(p) can be determined by calculating the following:

$$C(p) = \frac{1}{f}\left[\frac{(p - \min)(2^L - 1 - \min)}{(\max - \min)} + \min\right].$$

The first term (p-min) is included to account for the position or location of the original pixel value p (whose companded value is being computed) from the minimum. This location factor relates the pixel value from the minimum; since location is irrelevant in a prior art method that simply truncate bits or divides by a constant scaling factor, such a location factor is one unique aspect of one embodiment of the invention. The next term ($2^L$-1-min) is a shifting factor that indicates where within the total range of values the histogram(s) originate, or form another vantage, by much the histogram(s) is shifted in relation to the greatest possible endpoint $2^L$-1. The next term, (max-min) indicates the total range of pixel values from lowest to highest that are present in the image for all three color planes. The value "max" is described below with reference to FIG. 2. Thus, this factor may be viewed as a "stretching" factor indicating how wide the histograms stretch within the total possible range of 0 to $2^L$-1. The significance of the scaling, shifting may be visualized when three exemplary histograms (Red, Green and Blue) are superimposed as illustrated in FIG. 2.

Once the companded value C(p) is determined for the current index value p (either according to step 150 or step 160), it is stored into a companding table (step 165) which is indexed by p. The companding behavior is related to the characteristics of the image as obtained by analyzing the histogram and determining the "min", and "max" values (see FIG. 2 and associated description). According to one embodiment of the invention, a single commanding table is utilized for all three color planes, such that regardless of the associated color (R, G or B), a given pixel value is companded to the same value. After each companded value C(p) is determined, if p is still less than $2^L$-1, then the value of p is incremented by 1 (step 180). The steps 145 through 180 repeat for all p until p reaches a $2^L$-1, at which point, the companding table will have been completed for the entire possible set of original L-bit pixel values. The entire companding table, once generated is then used utilized to replace each pixel's value in the original captured image with a new J-bit companded value. The calorimetric ratio (the ratio of Red, Green and Blue present in the image) is still maintained after companding since the same companding table is used for each color channel.

Before the companding procedure shown in FIG. 1 can be carried out, the color value density count for each color value (value of a pixel associated with a color plane) in the range (0, $2^L$-1) must be determined. When an image sensor or other focal device captures an image, it does so by producing a set of pixels which have intensity values associated with one of three color channels for every location in the image area having dimensions rectangularly of M by N. Depending upon the "fineness" or capture area of digital and/or analog photocells in the focal image capture device, the M*N area will be captured as a number of pixel color values which collectively define the captured image area or view of the imaging device.

The "histogram" of values is a compilation of the density or number of occurrences of value. As individual pixels of an image are captured and their color (R, G, B) values are determined by the imaging device (sensor), a histogram table can be continually updated for each color plane. Alternatively, the entire captured image may be stored and later compiled. The histogram table (for each color plane) will be initialized to have $2^L$ elements, each element indexed by an L-bit value, each element capable of storing an L-bit density count. When all pixels composing a particular captured image are accounted for their density count values compiled into the histogram table, the histogram will represent a complete accounting of the density of each possible color value as present in the captured image. Ideally, three histograms, one for each R, G, B color plane, should be compiled. The histograms may be used in the companding procedure described in FIG. 1 above, especially for determining the "min" and "max" value of the histogram.

If the original image is captured into a Bayer pattern Color Filter Array (CFA) each pixel will have a 10-bit value that is associated with a particular color plane (Red, Green or Blue). This sub-sampling into three color planes indicates that each pixel will have color information relating to only one of the three traditionally utilized pixel color components (R, G, or B). An imaging device that operates in this manner to generate a Bayer pattern will only sense one color Red, Green or Blue for each pixel. While it might be of use in one embodiment to maintain a separate single histogram for all values regardless of associated color plane, the invention in another embodiment desires a histogram for each color plane (R, G and B), for the purposes of determining the companding behavior according to the technique described above with respect to FIG. 1.

FIG. 2 is a graph of R, G and B histograms superimposed together to illustrate the factors of the companding formula according to one embodiment of the invention.

FIG. 2 shows three curves, the exemplary histograms of values for each of three color planes, Red (R), Green (G) and Blue (B) for an image. In a dissimilar image from that shown in FIG. 2, the pattern of these histograms may vary. By taking the histogram into account when determining the minimum ("min") and maximum ("max") values for the companding behavior, the mapping achieved as a result of companding is tailored to the characteristics of the image. The horizontal axis of the histogram is an index of all possible pixel values (0 to $2^L$-1) in an L-bit per pixel image. Each histogram has a minimum value and maximum value lying along the horizontal axis indicating the minimum value and maximum value for which a non-zero density count occurs in the histogram within a certain percentile or tolerance.

This percentile or tolerance may be determined by analyzing the histogram itself. For instance, in a flat intensity color plane, where intensity values are more evenly distributed (such as the Red histogram curve of FIG. 2), it may be desirable to set the 10th percentile and 90th percentile in determining the minima and maxima for that color plane. Contrastly, a second percentile and 98th percentile may be desired when determining the minima and maxima for a more Gaussian natured curve (for instance, the Green histogram of FIG. 2). In FIG. 2, the Blue histogram has a maxima and minima which are absolute maxima and minima for the blue histogram (in other words, the lowest pixel value with a non-zero density count and highest pixel value with a non-zero density count are the minima and maxima, respectively). Alternatively, other statistical measures may be made in order to calculate the minima and maxima for each color plane. In a ideal case, the minima will simply be the lowest intensity value with a non-zero density count, and the maxima, the highest intensity value with a non-zero density. For histogram curves showing skews, other tolerance parameters may be established in determining the maxima and minima. In any case, the maxima and minima will be related to some characteristic in the captured image. In this manner, the choice of "max" and "min" used in the companding technique of FIG. 1 will reflect image characteristics. The choice of maximum and minimum for each color plane may also be affected by the properties of the sensing or capturing device such as noise patterns. The maxima and minima may be chosen so as to avoid potential recurring noise which is predictable due to device characteristics.

The maxima and minima are labeled minRed, maxRed; minGreen, maxGreen; and minBlue, maxBlue, respectively, for the Red, Green and Blue color plane histograms. As described above the technique of FIG. 1 uses a value "max" which is the maximum non-zero density count pixel value of all three histograms with a certain tolerance range. Thus, with respect to FIG. 2, this can represented by "max"= maximum(maxRed, maxGreen, maxBlue). Likewise, the value "min" referred to the FIG. 1 methodology, is in one embodiment of the invention, can be represented with reference to FIG. 2 as "min"=minimum(minRed, minGreen, minBlue). For the image represented by the exemplary histograms of FIG. 2, "min" would be determined to be the value minBlue, the minimum value with a non-zero density in the Blue histogram, while "max" would be determined to be maxRed, the maximum value with a non-zero density in the Red histogram. These results may vary from image to image and are merely illustrative as are the shape and configuration of the histograms of FIG. 2.

FIG. 2 can be referred to for a visual understanding of the various terms in the companding formula of FIG. 1 repeated herein for convenience:

$$C(p) = \frac{1}{f}\left[\frac{(p-\min)(2^L-1-\min)}{(\max-\min)} + \min\right]$$

where p is the pixel value for which a companded value C(p) is being determined. The first factor (p-min) is a location factor indicating the relative position of the pixel value being mapped to "min". The second factor $(2^L-1-\min)$ is a shifting factor indicating how far from the highest possible pixel value $(2^L-1)$ the value "min" lies or how far the entire composite histogram would be shifted away from zero (i.e., if min=0 then no shift at all).

Figure 3:
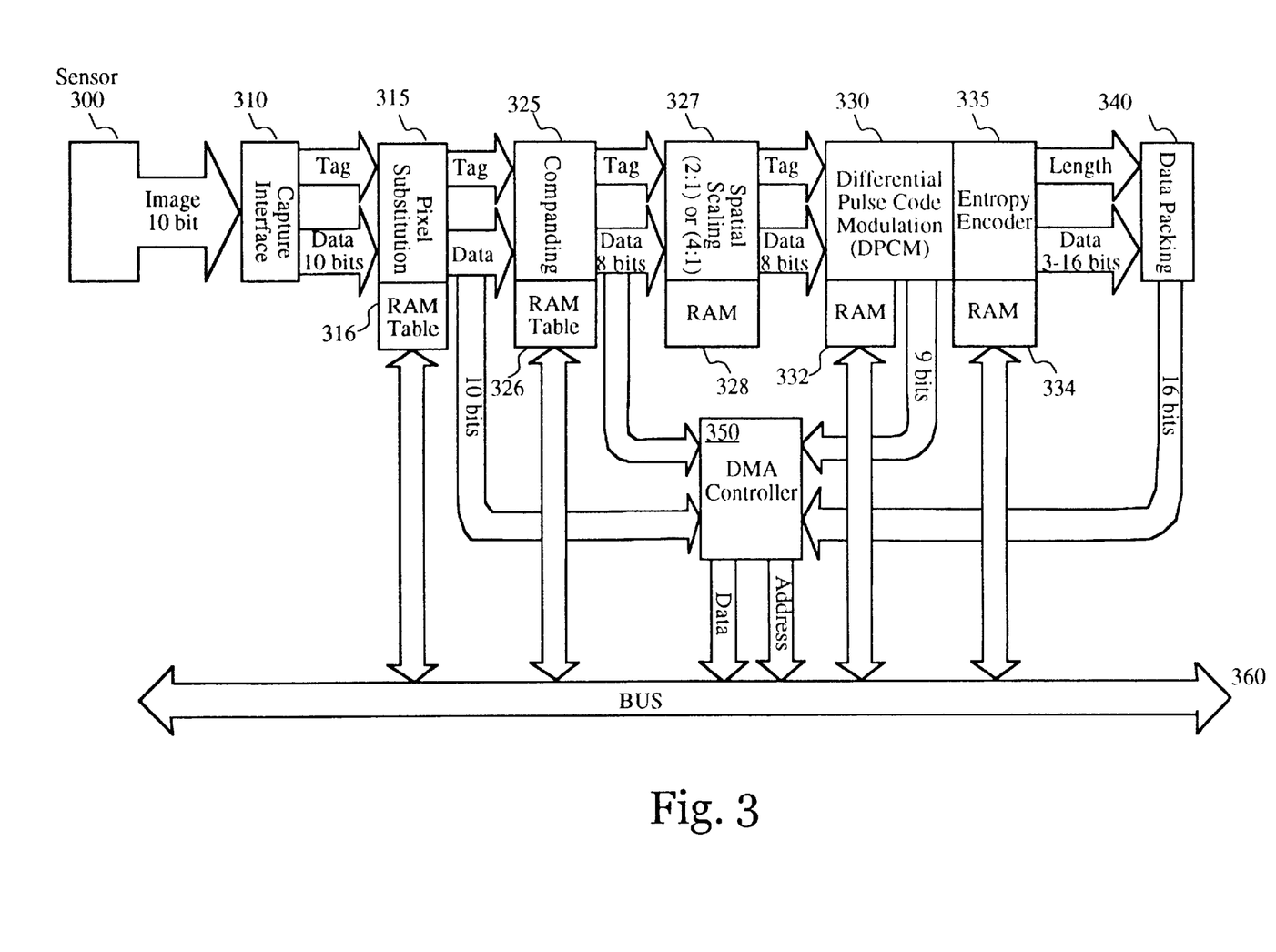
FIG. 3 is a diagram according to an embodiment of the invention.

FIG. 3 is a diagram according to an embodiment of the invention.

FIG. 3 is a block diagram of internal image processing and compression components of an image capture device. A sensor 300, generates pixel components which are color/intensity values from some source. The 10-bit pixel values generated by sensor 300 are sent to a capture interface 310. Sensor 300 in a digital camera context will typically sense either R, G, or B components from one "sense" of an area or location. Capture interface 310 captures the image generated by the sensor and appends TAGs identifying color association for the individual pixels. The TAGs are two bits each, for example, 00, 01, 10 and 11 for R (Red), G1 (even-row Green), G2 (odd-row Green), B (Blue) pixels, respectively.

It is typical in any CMOS (Complementary Metal-Oxide Silicon) or CCD (Charge Coupled Device) sensor that some of the pixel cells in the sensor plane may not respond to the lighting condition properly. As a result, the pixel values generated from these cell may be defective. These pixels are called "dead pixels." The "pixel substitution" unit 315 replaces each dead pixel by the immediate previously valid pixel in the row.

A RAM table 316 consists of the row and column indices of the dead pixels, which are supplied by the sensor. This RAM table 316 helps to identify the location of dead pixels in relation to the captured image. Companding module 325 is a table look-up based converter to convert each original pixel of 10-bit (labeled 10b) intensity captured from the sensor to an 8-bit intensity value. A RAM table 326 accompanies companding module 325 and stores the entries of the companding table.

As described in various other embodiments above, the invention provides an intelligent companding method and apparatus such that the resulting 8-bit image maintains important image features and characteristics after being companded. RAM table 326 is the completed companding table obtained as a result of carrying out the technique of FIG. 1. The companding or mapping table 326 gives a mapped 8-bit value for each 10-bit intensity from the pixel substituted data from module 315. The companding module 325 completes the companding process by looking up the mapped value for each original captured pixel value (using that intensity value as an address) of a pixel and substituting back the mapped intensity value for that pixel into the image array. Since RAM table 326 is dependent upon the makeup of the image being companded, the reduction in contrast will be uniform throughout the image such that the transformation from a brighter image to darker image (in the case of gray scale) will not be destructive of important image features such as edges. As shown in FIG. 3, the RAM table 326 may be accessed, for either read or write access, over a BUS 360, and thus the circuitry/software to determine the companding behavior and generate the companded values may originate entirely external to the Companding module 325 itself, or be distributed between module 325 and other external circuitry, or can be entirely integrated into the Companding module 325.

After companding, a spatial scaling unit 327 is used to scale down the image. If the original image size is M×N, the 2:1 scaling operation scales the image size down to M/2× N/2 and the 4:1 scaling operation scales it down to M/4×N/4. This allows for compaction of image which may be undesirably large. RAM 328 accompanies spatial scaling unit 327 and is used for intermediate storage during the scaling operation. For example, 4:1 scaling can be implemented by successively applying 2:1 scaling operation twice.

Once pixel component data is scaled, it is passed to a DPCM unit 330 and an entropy encoder 335. DPCM unit 330 and entropy encoder 335 perform image compression by generating an error image and quantizing that error. The quantized error values are entropy encoded by looking up corresponding codewords in RAM 334. The encoded data, which is then of a variable or fixed length for each original error value is then packed together by a data packing unit 340 and then out to DMA controller 350 for transfer across BUS 360. Bus technology, addressing protocols and DMA controllers are well-known in the art of system design and can be readily modified/specialized to fit the desired application.

Each of the RAM tables 316, 326, 328, 332 and 334 can directly communicate with bus 360 so that their data can be loaded and then later, if desired, modified. Further, those RAM tables and other RAM tables may be used to store color plane histograms as needed. By preloading data into those tables, and by using intelligent companding methods as described in various embodiments of the invention, image quality is enhanced and the overall cost of the system is reduced by using memory tables rather than expensive circuitry to perform every operation required in the image capture and conversion process.

Figure 4:
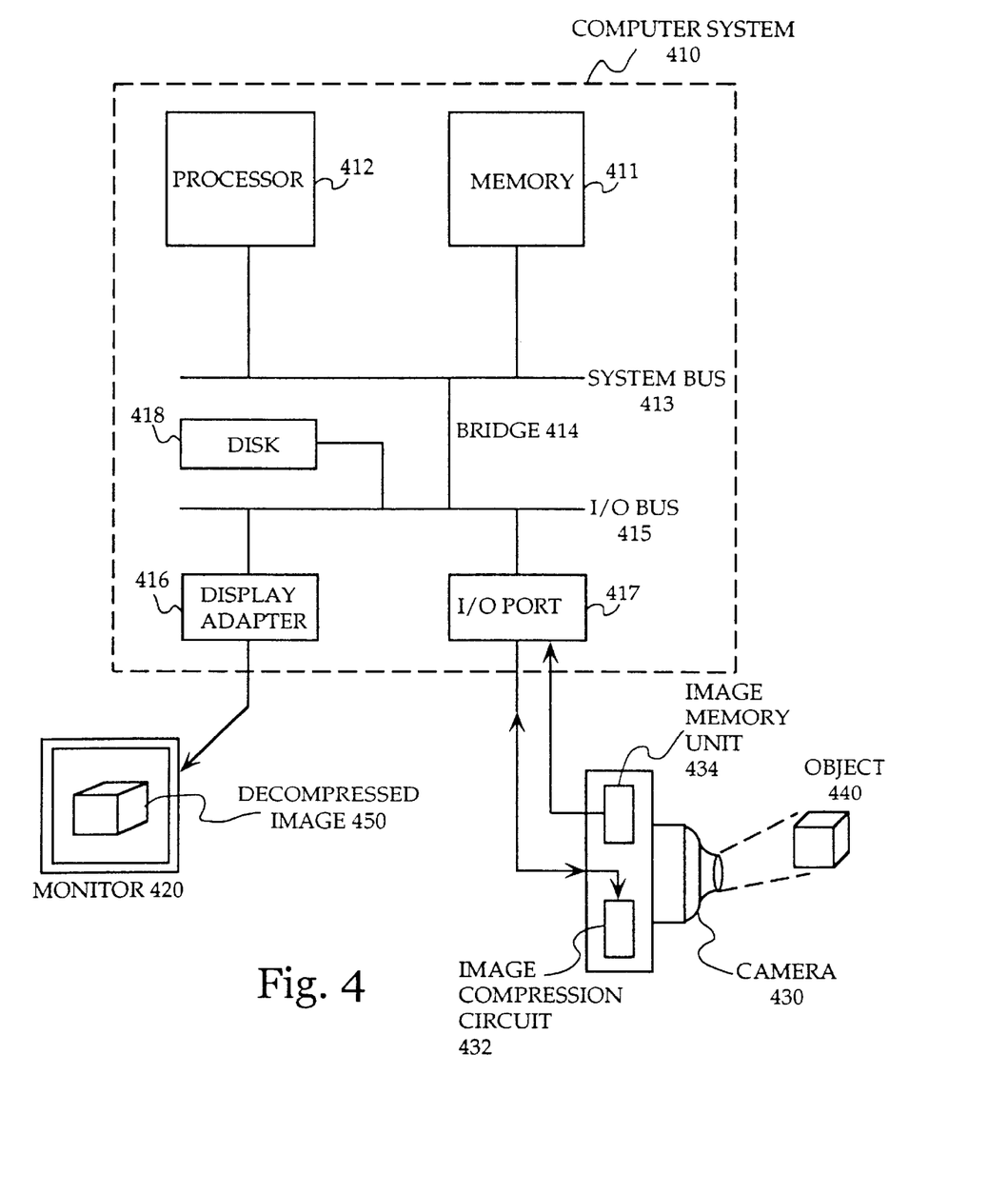
FIG. 4 is a system diagram of one embodiment of the invention.

FIG. 4 is a system diagram of one embodiment of the invention.

Illustrated is a computer system 410, which may be any general or special purpose computing or data processing machine such as a PC (personal computer), coupled to a camera 430. Camera 430 may be a digital camera, digital video camera, or any image capture device or imaging system, and is utilized to capture a sensor image of an object 440. Essentially, captured images are compressed by an image compression circuit 432 so that they can be efficiently stored in an image memory unit 434, which may be a ROM, RAM or other storage device such as a fixed disk. The image contained within image memory unit 434 that is destined for computer system 410 is enhanced in that the reduction in image feature due to prior art companding methods is greatly reduced by taking into account the original distribution of pixel intensities when companding. In most digital cameras, images are stored first and downloaded later. This allows the camera 430 to capture the next object quickly without additional delay.

As described above, image companding is one part of the entire image capture/compression process and has been improved upon from the prior art in the various embodiments of the invention. Image companding is carried out within the image compression circuit 432 in this embodiment of the invention. The decompression of the image compressed and stored in Image Memory Unit 434 is achieved using a processor 412 such as the Pentium® brand (a product of Intel Corporation) and a memory 411, such as RAM, which is used to store/load instruction addresses and result data. The application(s) used to determine the companding behavior generate companding values and to decompress the processed image after download from camera 430 may be an executable file compiled from source written in a language such as C++. The instructions of that executable file, which correspond with instructions necessary to decompress the image, may be stored to a disk 418 or memory 411. It would be readily apparent to one of ordinary skill in the art to program a computing machine to decompress an image given that the original compression methodology is known.

Computer system 410 has a system bus 413 which facilitates information transfer to/from the processor and memory and a bridge 414 which couples to an I/O bus 415. I/O bus 415 connects various I/O devices such as a display adapter 416, disk 418 and an I/O port 417, such as a serial port. Many such combinations of I/O devices, buses and bridges can be utilized with the invention and the combination shown is merely illustrative of one such possible combination.

When an image, such as an image of object 440, is captured by a sensor, the sensor captures for each pixel, a gray scale intensity value (or one of R, G, or B components for color capture) and these pixel intensity values are then sent to the image compression circuit 432. Image compression circuit 432 consists of ICs and other components which execute, among other functions, the companding of the captured image. The companding process, as described earlier, utilizes the density count or number of occurrences of the possible intensity values (histograms) in the image of the object 440 as captured by the sensor of camera 430. Then, a companding look-up table is obtained by calculating the mapped values based on the companding behavior. These values may be generated external to the camera 430 such as in the computer system 400 and then downloaded to camera 430. Finally, another circuit such as the Companding circuit 325 of FIG. 3 will look up and replace each original intensity value with a corresponding mapped intensity value which is of a lower bit resolution. Once all pixel intensity values are accounted for, and the companding and other compression functions such as entropy encoding are complete, the camera 430 can capture the next image. When the user or application desires/requests a download of images, the compressed images stored in the image memory unit are transferred from image memory unit 434 to the I/O port 417. I/O port 417 uses the bus-bridge hierarchy shown (I/O bus 415 to bridge 414 to system bus 413) to temporarily store the compressed image data into memory 411 or, optionally, disk 418.

The compressed images are decompressed by suitable application software (or hardware), which may utilize processor 412 for its execution. Decompressed image 450 may then be rendered visually using a display adapter 416 onto a monitor 420 to which the computer system 410 may be connected. As discussed earlier, the decompressed image will have more visually accurate features than prior art decompressed images due to the enhancement in the companding process described with regard to various other embodiments of the invention. The end result will be a higher quality decompressed image 450 displayed onto monitor 420 as compared with prior art companding schemes even if they also use similar compression techniques elsewhere in the process.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
    determining a set of factors related to the color characteristics of a captured image, said set of factors include a minimum intensity value, a maximum intensity value, a scaling factor, a shifting factor, a location factor, and a stretching factor, said stretching factor includes the distance between said maximum intensity value and said minimum intensity value, and said shifting factor includes the distance of said minimum intensity value from the largest possible pixel value in said captured image; and
    companding said captured image into a companded image having a lower bit-per-pixel resolution, said companding being dependent upon said set of factors, wherein said scaling factor includes the ratio of $2^J$ to $2^L$, where J represents the bit resolution per pixel of said companded image and L the bit resolution of said captured image, and said location factor includes the relative location of a pixel value being companded in relation to said minimum intensity value.

2. A method according to claim 1 wherein said minimum intensity value is the minimum value of a set of minimum intensity values, said set of minimum intensity values including a minimum for each color plane present in said captured image.

3. A method according to claim 2 wherein each minimum for said each color plane present in said captured image is the lowest value within a certain tolerance having a non-zero density count.

4. A method according to claim 1 wherein said maximum intensity value is the maximum of a set of maximum intensity values, said set of maximum intensity values including a maximum for each color plane present in said captured image.

5. A method according to claim 4 wherein each maximum for said each color plane present in said captured image is the highest value within a certain tolerance having a non-zero density count.

6. A method according to claim 1 wherein said companding further comprises:

generating a single companding table which maps higher bit resolution values to lower bit resolution values; and replacing each captured image pixel value with its mapped value as related in said companding table, wherein said companding table is applied to all color planes present in said image.

7. A method according to claim 6 wherein said generating further comprises:

determining a companded value based on a manipulation of said set of factors for each higher bit resolution value possible in said captured image.

8. An apparatus for processing a captured image comprising:

a companding look-up table, said look-up table comprised of a mapping of higher bit resolution values to lower bit resolution values, said mapping being dependent upon a set of factors related to characteristics of said captured image, said set of factors include a minimum intensity value, a maximum intensity value, a scaling factor, a shifting factor, a location factor, and a stretching factor, said stretching factor includes the distance between said maximum intensity value and said minimum intensity value, said shifting factor includes the distance of said minimum intensity value from the largest possible pixel value in said captured image said scaling factor includes the ratio of $2^J$ to $2^L$, where J represents the bit resolution per pixel of said companded image and L the bit resolution of said captured image, and said location factor includes the relative location of a pixel value being companded in relation to said minimum intensity value; and companding circuitry coupled to said look-up table, said companding circuitry to replace each value of said captured image with a corresponding mapped value obtained from said look-up table.

9. An apparatus according to claim 8 further comprising a memory to store a histogram for each color plane present in said captured image, said histogram having, for each of said higher bit resolution values, a density count indicative of the number of occurrences of said value in said captured image for being used to determine said minimum intensity and said maximum intensity value.

10. A system comprising:

an image capture device configured to capture and compand a captured image from a higher bit per pixel resolution to a lower bit per pixel resolution, the companding to be based on characteristics of said image; and a data processing unit configured to supply a companding table to said image capture device, said companding table generated by analyzing said image characteristics to determine a set of factors including a minimum intensity value, a maximum intensity value, a scaling factor, a shifting factor, a location factor, and a stretching factor, said stretching factor includes the distance between said maximum intensity value and said minimum intensity value, said shifting factor includes the distance of said minimum intensity value from the largest possible pixel value in said captured image, said scaling factor includes the ratio of $2^J$ to $2^L$, where J represents the bit resolution per pixel of said companded image and L the bit resolution of said captured image, and said location factor includes the relative location of a pixel value being companded in relation to said minimum intensity value.

11. A system according to claim 10 further comprising:

a memory unit coupled to said image capture device, said memory unit configured to load said supplied companding table.

12. A system according to claim 10 wherein said image capture device is supplied a new companding table by said data processing unit when a new image is captured.

13. An article of manufacture comprising:

a machine-readable medium having instructions stored therein which, when executed by a processor, cause an electronic system to determine a set of factors related to color characteristics of a captured image, said set of factors include a minimum intensity value, a maximum intensity value, a scaling factor, a shifting factor, a location factor, and a stretching factor, said stretching factor is the distance between said maximum intensity value and said minimum intensity value, and said shifting factor is the distance of said minimum intensity value from a largest possible pixel value in said captured image, and compand said captured image into a companded image having a lower bit-per-pixel resolution, said companding being dependent upon said set of factors, wherein said scaling factor includes the ratio of $2^J$ to $2^L$, where J represents the bit resolution per pixel of said companded image and L the bit resolution of said captured image, and said location factor includes the relative location of a pixel value being companded in relation to said minimum intensity value.

14. The article of manufacture of claim 13 wherein the machine-readable medium has further instructions which, when executed by the processor, cause the system to select said minimum intensity value as the minimum of a set of minimum intensity values which includes a minimum for each color plane present in said captured image.

15. The article of manufacture of claim 14 wherein the machine-readable medium has further instructions which, when executed by the processor, cause the system to select said maximum intensity value as the maximum of a set of maximum intensity values which includes a maximum for each color plane present in said captured image.

* * * * *

UNITED STATES PATENT AND TRADEMARK OFFICE
CERTIFICATE OF CORRECTION

PATENT NO. : 6,351,555 B1  
DATED : February 26, 2002  
INVENTOR(S) : Acharya et al.

Page 1 of 1

It is certified that error appears in the above-identified patent and that said Letters Patent is hereby corrected as shown below:

Column 3,  
Line 52, delete "one of the those" and insert -- one of those --.

Column 5,  
Line 46, delete "commanding" and insert -- companding --.

Signed and Sealed this

Twentieth Day of August, 2002

Attest:

Attesting Officer

JAMES E. ROGAN  
Director of the United States Patent and Trademark Office